United States Patent
Fjellhaug et al.

(10) Patent No.: US 6,505,467 B1
(45) Date of Patent: Jan. 14, 2003

(54) PROCESS FOR GENERATING ELECTRIC ENERGY, STEAM AND CARBON DIOXIDE FROM HYDROCARBON FEEDSTOCK

(75) Inventors: Henrik O. Fjellhaug, Borgen (NO); Henning Reier Nilsen, Lier (NO); Werner Soyez, Voghiera (IT); Michel Saigne, St. Hyppolyte (FR)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/743,506

(22) PCT Filed: Jul. 13, 1998

(86) PCT No.: PCT/NO98/00213
§ 371 (c)(1),
(2), (4) Date: Mar. 12, 2001

(87) PCT Pub. No.: WO00/03126
PCT Pub. Date: Jan. 20, 2000

(51) Int. Cl.[7] .............................................. F02B 45/00
(52) U.S. Cl. ............................. 60/780; 60/783; 60/784; 60/39.12; 60/39.182
(58) Field of Search ......................... 60/780, 783, 784, 60/39.12, 39.182

(56) References Cited

U.S. PATENT DOCUMENTS

| | | | |
|---|---|---|---|
| 4,193,259 A | * | 3/1980 | Muenger et al. ............ 48/215 |
| 5,715,671 A | * | 2/1998 | Griffiths ................. 60/39.12 |
| 6,282,880 B1 | * | 9/2001 | Wallace et al. ............ 423/237 |
| 6,314,715 B1 | * | 11/2001 | Stats ..................... 60/39.12 |

FOREIGN PATENT DOCUMENTS

WO    98/15414    4/1998

OTHER PUBLICATIONS

Article "New Technology Can Cut Carbon Dioxide Emissions", no later than Apr. 23, 1998.

* cited by examiner

Primary Examiner—Charles G. Freay
(74) Attorney, Agent, or Firm—Wenderoth, Lind & Ponack, L.L.P.

(57) ABSTRACT

A process producing electric energy, steam and carbon dioxide in concentrated form from a hydrocarbon feedstock. The process includes forming synthesis gas in an air driven autothermal reactor unit (ATR), heat exchanging the formed synthesis gas and thereby producing steam, treating at least part of the synthesis gas in a CO-shift reactor unit and carbon dioxide separation unit for formation of concentrated carbon dioxide and a lean hydrogen containing gas which is combusted in a combined cycle gas turbine for production of electric energy, and where air from the turbine is supplied to the ATR unit. The exhaust from the gas turbine is heat exchanged for the production of steam which together with steam generated upstream said unit is utilized in a power generator for production of substantially $CO_2$-free electric energy. Steam may be fed to the gas turbine for diluting the hydrogen containing gas mixture. The process may also be combined with the production of synthesis gas products such as methanol and/or ammonia. Part of the gas from the carbon dioxide removal unit may be utilized in a fuel cell.

11 Claims, 7 Drawing Sheets

PROCESS FOR GENERATING ELECTRIC ENERGY, STEAM AND CARBON DIOXIDE FROM HYDROCARBON FEEDSTOCK

BACKGROUND OF THE INVENTION

1. Field of the Invention

The present invention relates to a process comprising producing electric energy, steam and carbon dioxide in concentrated form from a hydrocarbon feedstock. The invention further comprises optionally producing synthesis gas based products combined with the process.

2. Description of the Related Art

Electric energy is produced in a combined cycle power plant integrated with a reforming plant where a gas turbine is fueled by hydrogen containing gas. (Integrated Reforming Combined Cycle (IRCC)). A major problem in such a process is operating the gas turbine at conditions having minimum nitrogen oxide emission and simultaneously achieving optimal electric energy and steam production.

A process for producing electric power, steam and concentrated carbon dioxide is published on Internet as an article entitled "NEW TECHNOLOGY can cut carbon dioxide emissions". In this publication there is described a process comprising reacting natural gas with steam subsequently resulting in a hydrogen containing gas which is combusted in a combined cycle gas turbine producing electric power.

From Japanese patent application JP608041, it is further known to apply a hydrogen fired turbine for production of electric energy. According to this application, natural gas and oxygen in a mol ratio 1:0.5 to 1:0.7 is reacted by partially oxidizing the fuel to generate hydrogen and carbon monoxide. Air is supplied to a pressure swing absorption oxygen separator (PSA) and the oxygen is then delivered to an autothermal reactor (ATR) where the natural gas is transformed to hydrogen and carbon monoxide. The reformed gas enters a shift reactor in which the carbon monoxide is converted to carbon dioxide. The gas mixture is then introduced into a membrane separator in which hydrogen is separated from the carbon dioxide. The separated $CO_2$ is washed-out and desorbed later on. The hydrogen substantially free from carbon compounds is used in a gas turbine for generating electric power. This process requires oxygen, demanding a power consuming PSA unit. According to the application flow sheet, the natural gas must be decompressed nearly to ambient pressure to permit the addition of oxygen. After the PSA separation, the oxygen must be compressed a second time. All of these extra compressions reduce the efficiency of the process.

SUMMARY OF THE INVENTION

The main object of the present invention is to provide an improved process for generating power using steam reforming of a hydrocarbon feedstock, in which a substantial part of the generated $CO_2$ is separated as a highly concentrated $CO_2$ gas stream and where the emission of nitrogen oxides is within acceptable levels for conventional gas turbines.

Another object of the present invention is to utilize at least a part of the formed synthesis gas of the power generating process for the production of synthesis gas products, especially ammonia, methanol and/or dimethylether.

With regard to electric energy generation, the present process will compete with conventional power plants based on the combustion of hydrocarbon feedstock, such as natural gas. However, one major disadvantage of simply combusting hydrocarbons is that the emission of carbon dioxide as the exhaust from the combustion only contains minor amounts of carbon dioxide which at present cannot be economically recovered. The emission of nitrogen oxides (NOX) which varies depending on the operating conditions may also constitute an emission problem.

A major problem when reducing the emission of carbon dioxide and NOX is obtaining the desired emission reduction without an unacceptable reduction of efficiency of the process with regard to power generation. The first step in evaluating the basic process in view of the above requirements was the synthesis gas production step. Having considered various methods, the inventors found that an ATR would give several advantages and it was decided to investigate further the best way of running the ATR. Contrary to what was taught by the above Japanese patent application, it was found that the ATR should be an air driven reactor, i.e., not an oxygen driven reactor. The application of the ATR seemed to offer several advantages in terms of degrees of freedom. Thus, the operating pressure could be chosen in view of the overall economy of the concept. The methane slip could be varied in view of the operation of downstream units and finally, the synthesis gas produced in the ATR would be a relatively lean gas suitable for the gas driven turbine and comparable to fuel mixtures being used in proven, large scale combined cycle plants (IRCC).

Useful hydrocarbon feedstock for such a process will be natural gas, nafta, various petroleum distillates, etc. By applying a pre-reformer ahead of the ATR, the flexibility with regard to feedstock will be fairly great. However, the preferred feedstock will be natural gas.

The NOX problem was found to be strongly related to operating conditions of the gas turbine. The NOX-formation is correlated to the flame temperature in this turbine. Accordingly, provisions for regulating the flame temperature should be made. The range of gas mixture to be combusted in the turbine could be selected through the design of the process in order to keep the flame temperature at a desired level and still maintain acceptable power generation. The flame temperature in the turbine is largely determined by the composition of the fuel gas. It was found that an airdriven ATR would provide a lean hydrogen based fuel gas mixture compatible with gases being used in IGCC-plants. It was found advantageous to extract process air for the ATR at the discharge of the gas turbine's air compressor and boost to the required ATR-injection pressure. Further, the air flow could be adjusted to meet the agreeable level of methane slip, and the composition of the fuel-gas mixture could be compatible with an acceptable level of NOX-formation in the gas turbine combustion system. The nitrogen extracted with the air from the gas turbine is returned to the turbine part as a component of the fuel gas mixture, thus largely maintaining the turbine mass flow.

If need be, moderate steam injection can be applied to reduce the NOX-formation in the turbine, and an optimal design of the burner can also reduce the NOX-emission.

One alternative within the concept of the invention is to combine the ATR with a reformer exchanger. It was found that this option could increase the recovery of $CO_2$ in concentrated form.

In order to obtain maximum flexibility, the basic power generating concept could be combined with the production of various products based on the existing process streams. Thus, a methanol unit could utilize some of the synthesis gas from the ATR and an ammonia plant could utilize some of the hydrogen/nitrogen gas separated from the carbon dioxide subsequent to the shift reaction of the synthesis gas. The only extra units required for the ammonia plant would be a conventional membrane separation unit and a methanator upstream of the ammonia synthesis reactor.

The scope of the invention comprises forming synthesis gas in an air driven ATR unit, heat exchanging the formed synthesis gas and thereby producing steam. At least part of the cooled synthesis gas is then treated in a CO-shift reactor, which may be one single unit or two CO-shift reactors, one low temperature reactor and one high temperature reactor. The gas stream is further treated in a carbon dioxide unit for formation of a concentrated stream of carbon dioxide and one stream is a lean hydrogen containing gas which is at least partly combusted in a combined cycle gas turbine for the production of electric energy. Air from the turbine is supplied to the ATR unit. The exhaust from the gas turbine is heat exchanged for the production of steam which together with steam generated upstream is utilized in a steam turbine for production of electric energy.

The ATR unit can be combined with a reformer exchanger and the feedstock can be split between these two units. Preferably 50–80% of the feedstock is fed to the ATR. A pre-reformer can be arranged upstream of the ATR unit. A minor part of the steam generated in the process can be fed to the gas turbine for diluting the hydrogen containing gas and thereby lowering the flame temperature in the gas turbine. At least part of the exhaust from the gas turbine can be recycled to the ATR as an oxygen source or combined with the air supply to the gas turbine. Part of the synthesis gas can be utilized for methanol production and this production can be performed in various ways as described above in connection with FIG. 1.

Part of the gas from the carbon dioxide separation unit can be utilized for ammonia production. In this case, stream is fed to a membrane separation unit for separating out hydrogen which is mixed with another hydrogen containing gas stream, whereby the mixed stream will have a nitrogen:hydrogen ratio of 1:3. The nitrogen from the membrane unit is returned to the main hydrogen containing gas stream subsequently fed to the gas turbine.

BRIEF DESCRIPTION OF THE DRAWINGS

The invention will be further explained in connection with the examples and the description of attached Figures, in which.

DETAILED DESCRIPTION OF THE INVENTION

Figure 1:
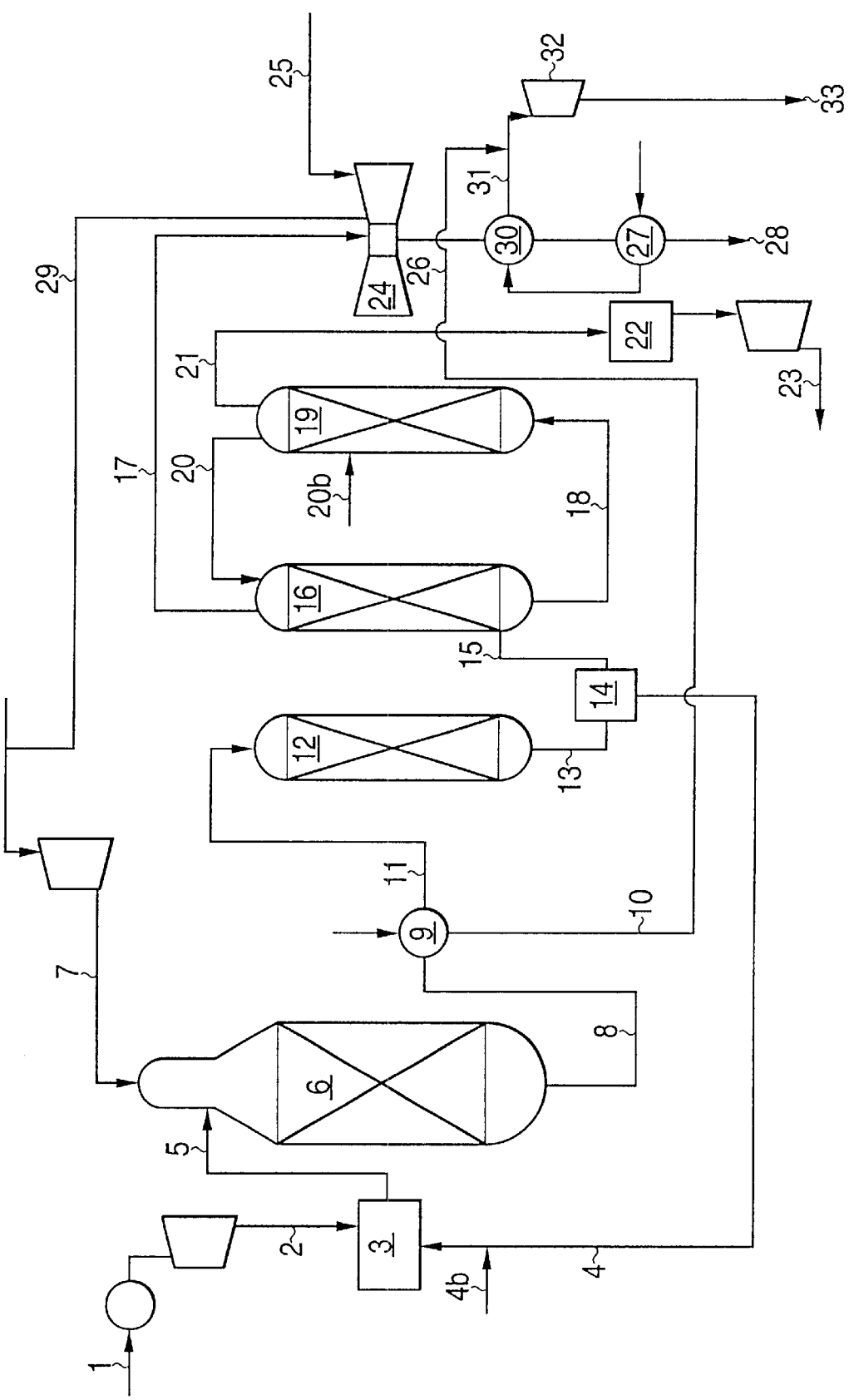
FIG. 1 shows a simplified flow sheet of the basic power generating concept.
Figure 3:
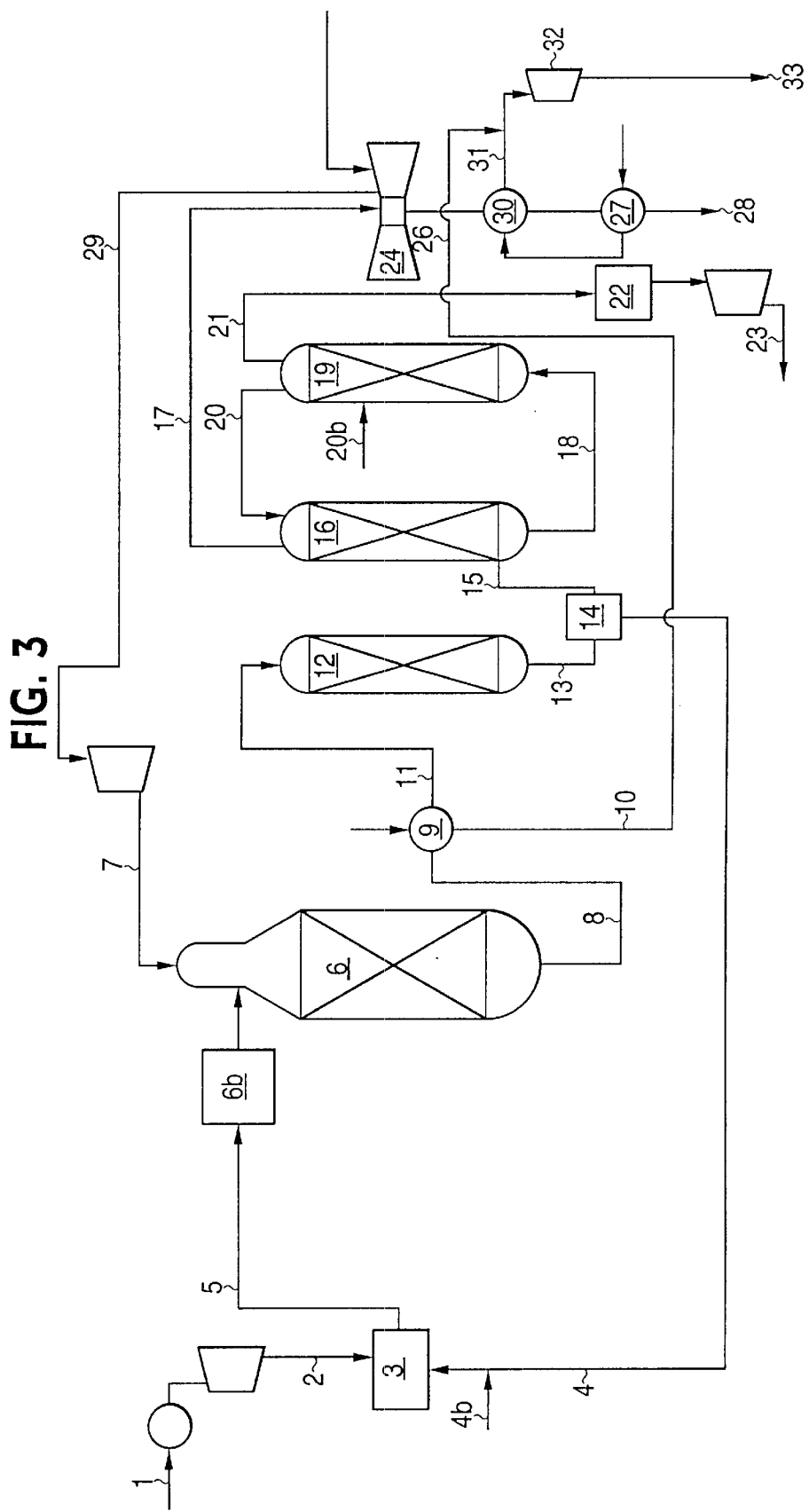
FIGS. 3–7 show variations of the basic power generating concept.

FIG. 1 shows an example for performing the invention. Gaseous hydrocarbon feedstock, for instance natural gas, is supplied as stream 1. The feedstock is heated and compressed before it passes through a conduit 2 to be supplied to a saturator 3 where the feedstock is mixed with process water 4 and demineralized make up water supplied through a line 4b. The hydrocarbon feed which is at least partly saturated with water is then fed to an ATR unit 6 as stream 5. Compressed air is supplied through a conduit 7 to the ATR unit 6. Optionally a pre-reformer 6b may be arranged upstream the ATR unit 6 (see FIG. 3). This will give increased flexibility with regard to the hydrocarbon feedstock and an increased content of heavier hydrocarbons can then be accepted.

Figure 4:
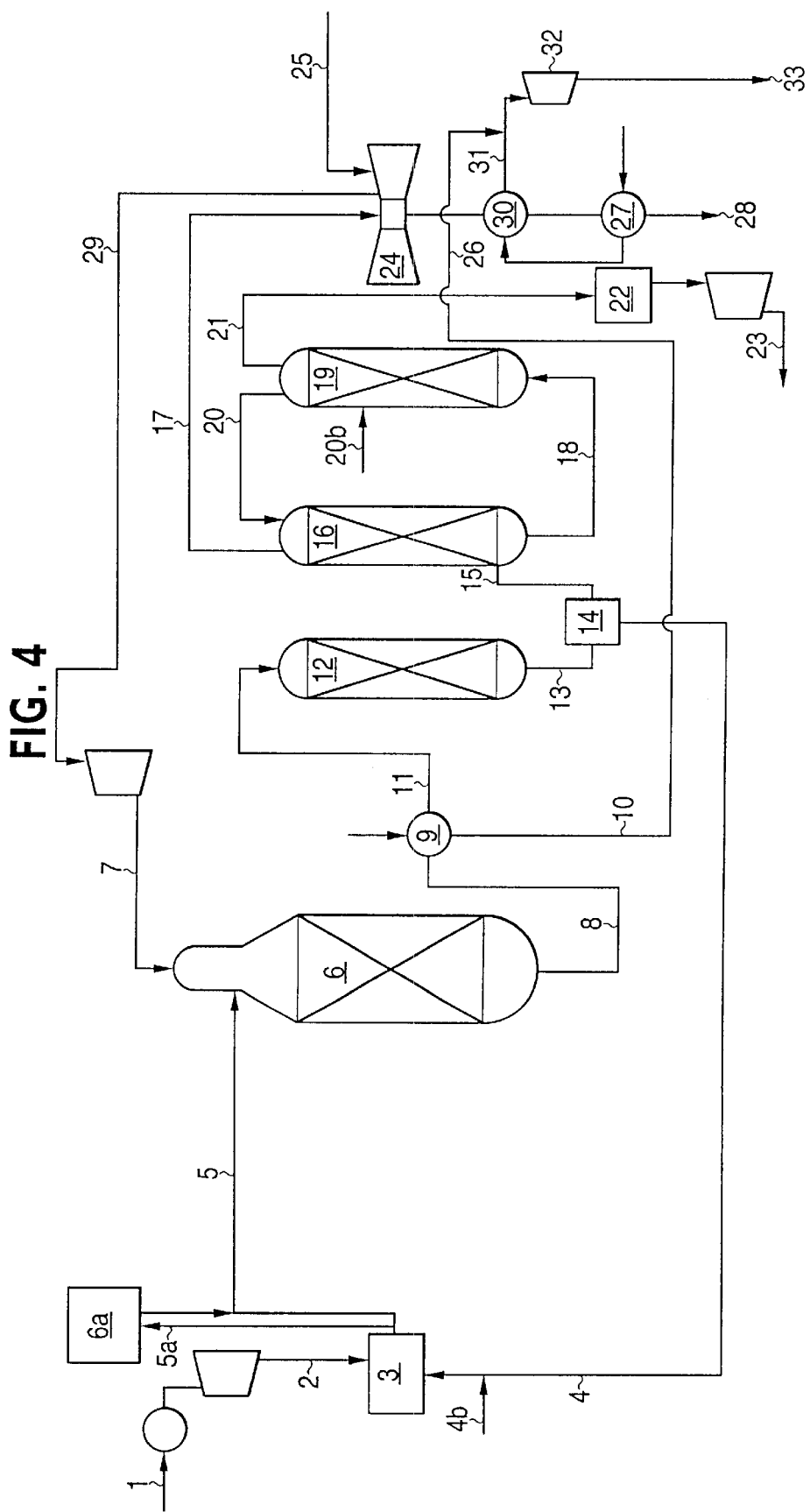

At least part of an air supply 29 can be supplied from a gas turbine air compressor and boosted to a necessary injection pressure. The ATR unit 6 can also be a combined unit comprising an ATR and a reformer exchanger 6a (see FIG. 4). How much of the hydrocarbon feedstock shall be fed to the respective units can be varied within wide limits. A practical split will be 50–80% of the feedstock to the ATR and the remaining part 5a to the reformer exchanger.

A synthesis gas 8 from the ATR unit 6 is cooled in a boiler (steam generator) 9 before being supplied to a shift converter unit 12 as stream 11. The shift converter unit 12 may comprise two conventional CO-shift reactors, a low temperature (LT) reactor and a high temperature (HT) reactor, or just one single CO-shift reactor. A resulting gas mixture 13 is cooled, condensed water is removed in a unit 14 and a resulting gas mixture is then supplied as stream 15 to a $CO_2$ absorber 12 from which $CO_2$ and absorbent is supplied through a conduit 18 to a desorber 19. Make up absorbent can be supplied to the desorber 19 as stream 20b. The regenerated absorbent, for instance an amine solution, is recycled to the absorber 16 through a conduit 20.

Water is removed in a unit 22 from a $CO_2$ stream 21 from the desorber 19. The process water from the units 22 and 14 are recycled to the saturator 3. The highly concentrated $CO_2$ stream can then be compressed and delivered through line a 23 for further use, for instance as injection gas in an oil or gas field. A gas stream 17 from the $CO_2$ absorber 16 consists mainly of hydrogen and nitrogen, with minor amounts of CO, $CO_2$, $CH_4$. The gas stream 17 will then be used as fuel for a combined cycle gas turbine 24 to which air 25 is supplied. Optionally, steam 10 can be supplied to the turbine 24 for NOX-abatement.

Figure 5:
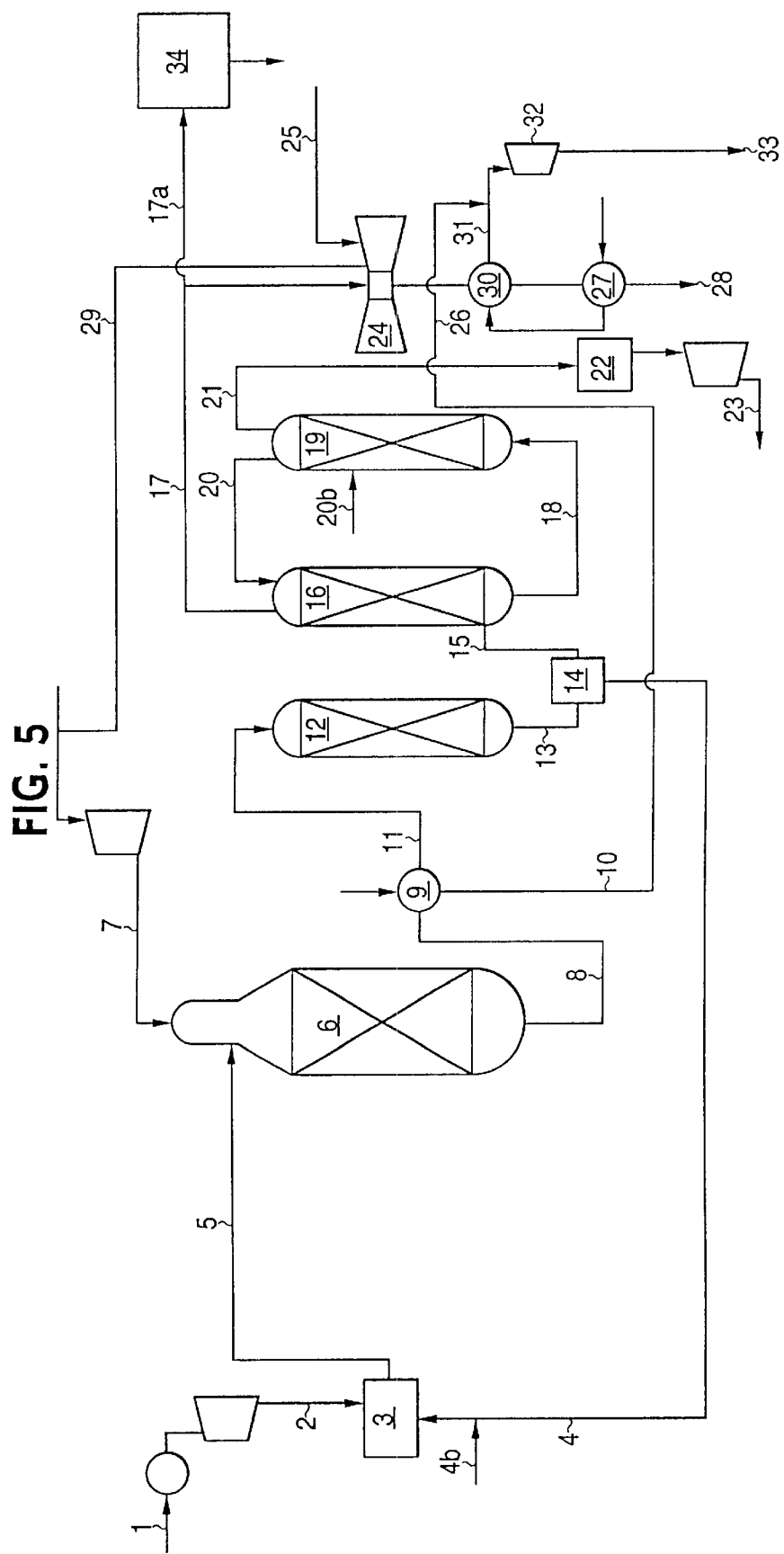
Figure 6:
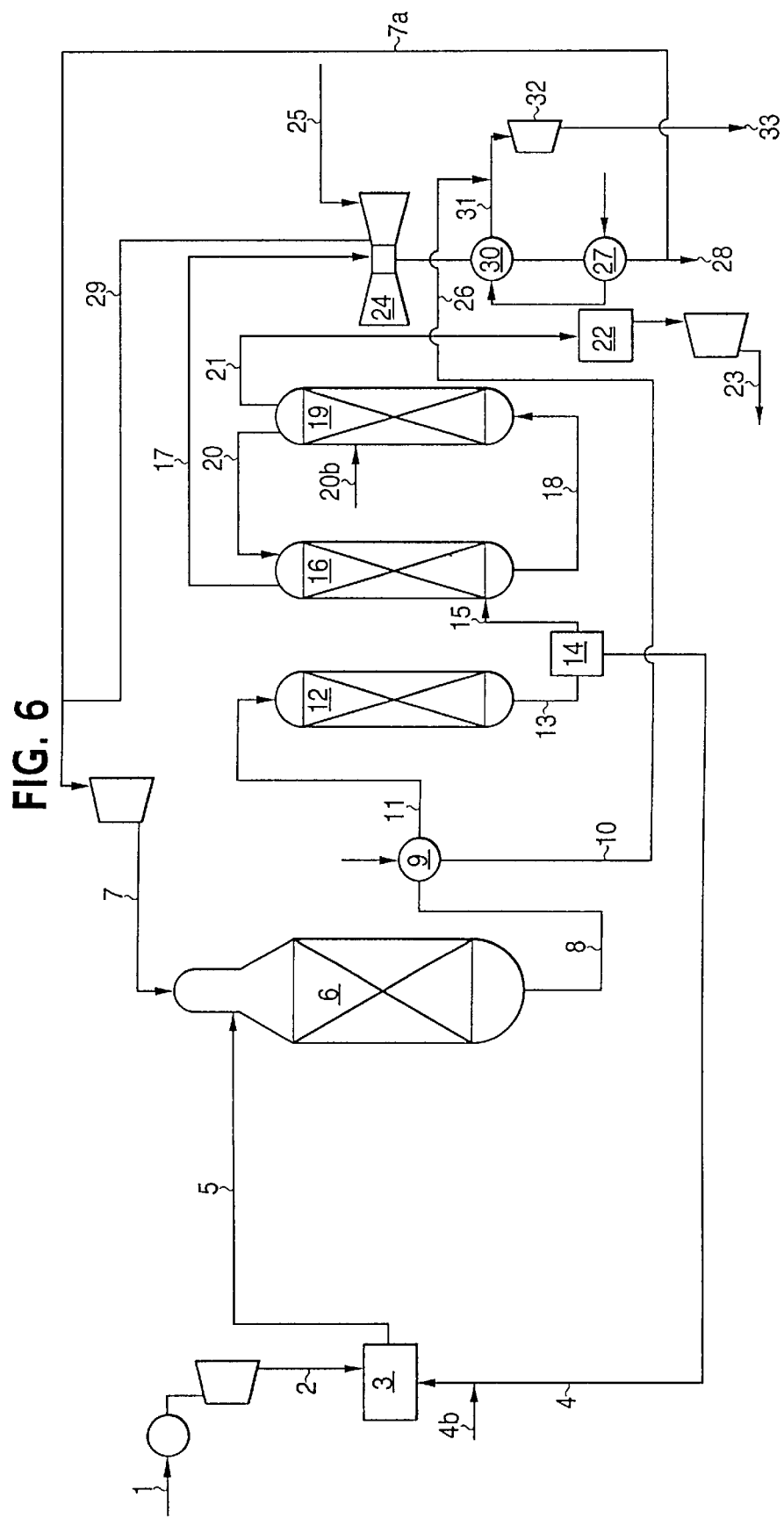
Figure 7:
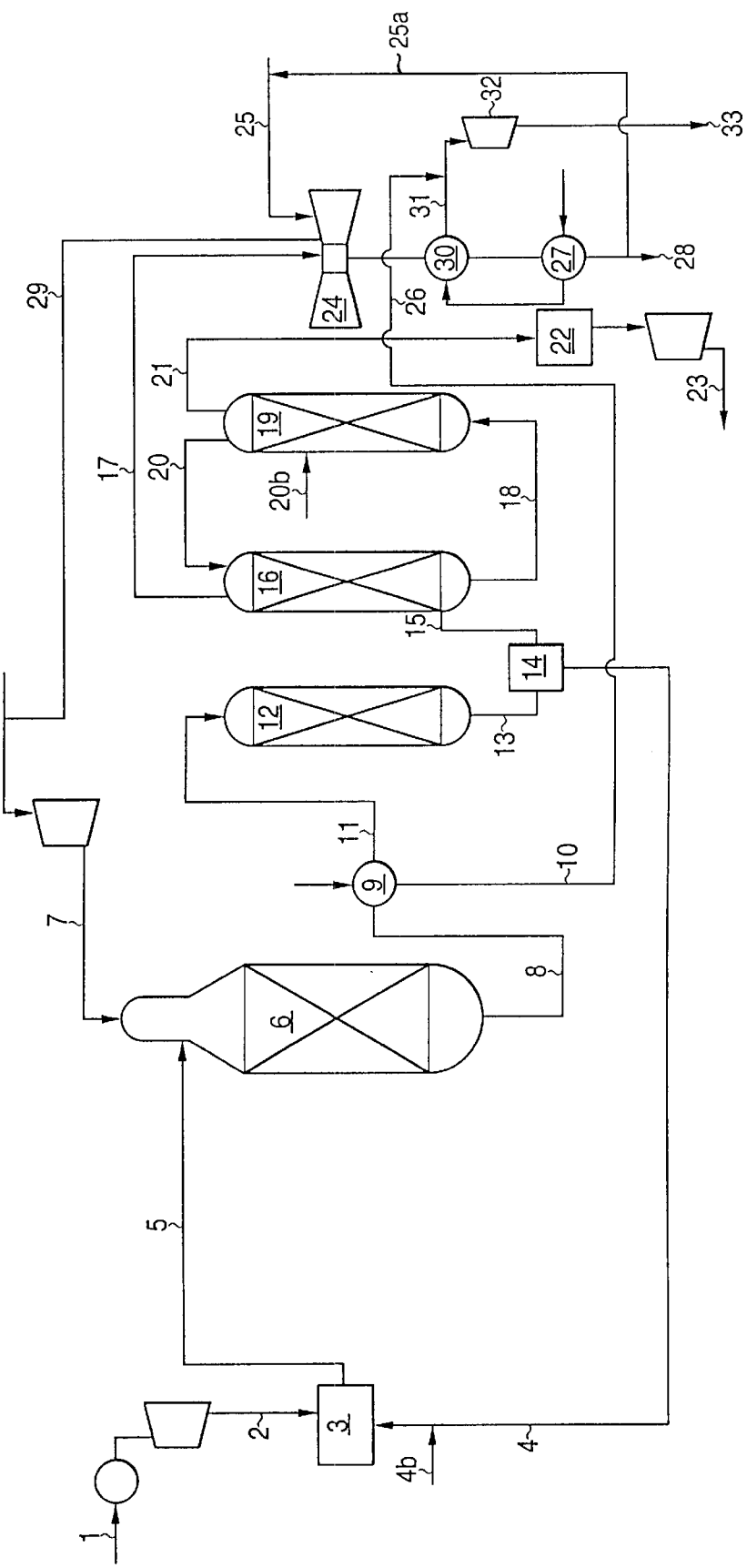

At least part 17a of the stream 17 can be utilized in a fuel cell 34 for generating direct current electric power (see FIG. 5). If the electric power shall be used for electrolysis there will be no need for a rectifier with this optional electric power generation. Exhaust 26 from the turbine 24 is heat exchanged with water in a steam generator 27 and the steam therefrom may be superheated in a heat exchanger 30 before stream 31 is supplied to a power generator 32 to which the steam 10 may be supplied. Exhaust 28 from the stream generator 27 may be recycled 7a to the reformer unit 6 (see FIG. 6) or combined 25a with the air 25 supplied to the gas turbine 24 (see FIG. 7).

Figure 2:
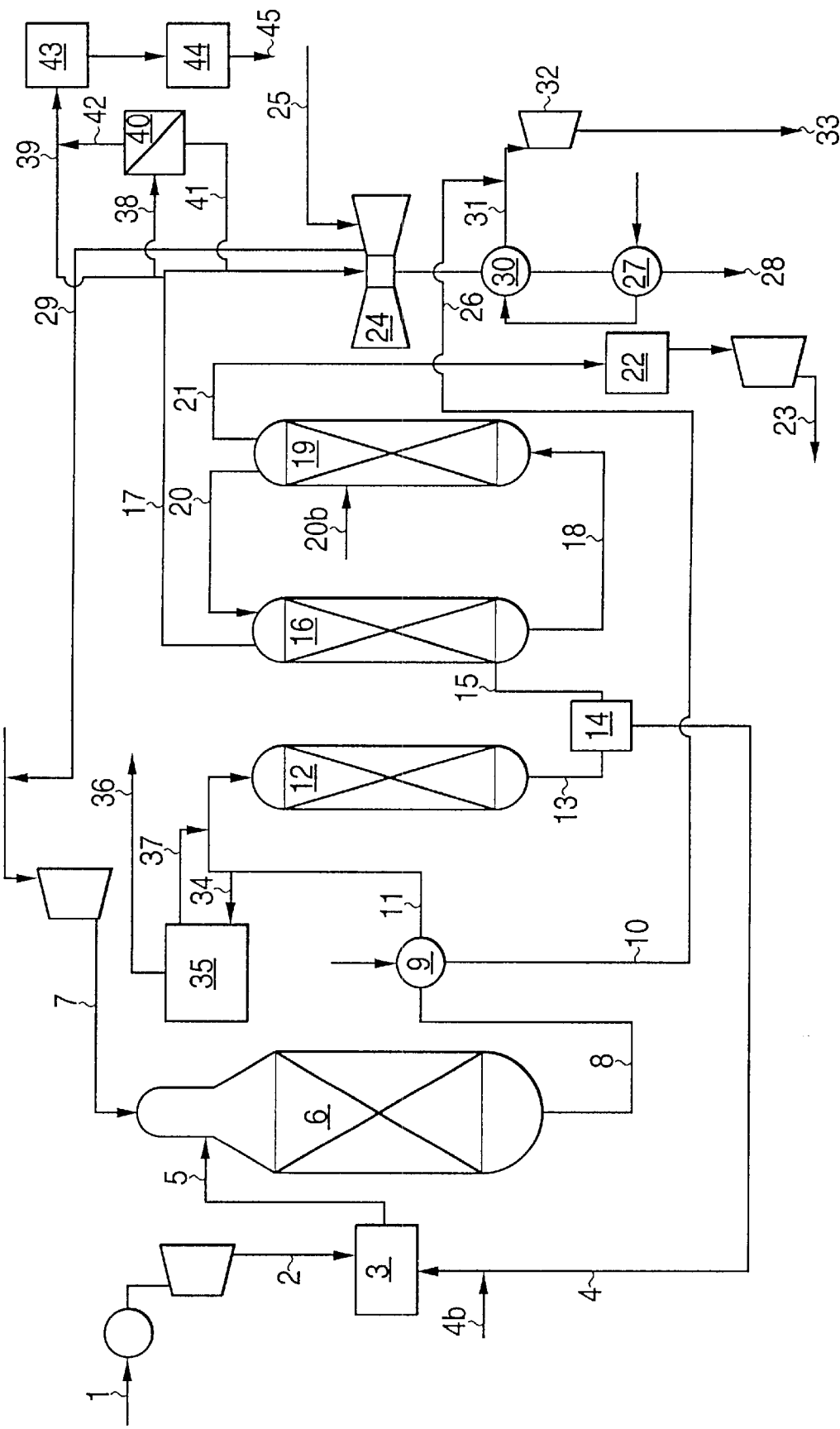
FIG. 2 shows a simplified flow sheet of the basic concept combined with a methanol plant and/or an ammonia plant.

In FIG. 2, an ammonia plant and a methanol plant are integrated in the basic process according to FIG. 1. The combined process may comprise both of the plants or one of them. Synthesis gas 34 can be taken from the stream 11 and supplied to a methanol synthesis 35. Unconverted synthesis gas 37 can be recycled to the synthesis gas stream 11 and product methanol is drawn off through a conduit 36. The synthesis gas 34 may alternatively be treated in a gas separation membrane unit for removing hydrogen and carbon dioxide to be fed to the methanol synthesis 35. This feed may be supplied with additional carbon dioxide from the stream 23. The other fraction from said membrane unit will then be recycled to the stream 11.

As feed for an ammonia synthesis may be drawn from the line 17. One side stream 38 is first fed to a membrane gas separation unit 40 for supplying hydrogen 42 to a line 39 to adjust the $H_2$:$N_2$ ratio to 3:1 before this gas mixture is treated in a methanation unit 43 prior to a ammonia synthesis 44 producing ammonia 45. Nitrogen from the membrane unit 40 is recycled through a line 41 to the feed 17 for the hydrogen turbine 24.

Example 1

This example shows the effect of the present invention with regard to electric power production, efficiency and recovery of carbon dioxide as a concentrated stream in a process within FIG. 1. The example further shows the efficiency, recovery of concentrated carbon dioxide and total power production of the process compared to the same for a process applying a primary-secondary reformer for production of synthesis gas. This illustrative example shows the effects of exhaust recycling to the ATR and it also shows the effects of combining the ATR with a reformer exchanger. In the following table, the combination is ATR-RE. The process according to the invention is compared with the utilization of a combination of a secondary-primary reformer for producing the synthesis gas, SR/PR in the table. The molar steam : carbon ratio in the feed to the reformer unit is stated as Steam:C in the table.

process has great flexibility. NOX-formation will generally be a function of the hydrogen % in the gas fed to the gas turbine.

The present invention provides a process producing clean carbon dioxide suitable as driving gas for injection in oil reservoirs. The IRCC-plant will thus operate with minimal emission of carbon dioxide. Further, the process provides a lean combustion fuel gas mixture based on hydrogen, which is suitable for combustion in current gas turbines technology. Moderate dilution with steam of the gas mixture fed to the gas turbine can be applied as the only NOX-abatement required.

What is claimed is:

1. A process for the production of electric energy, steam, and carbon dioxide in concentrated form from a hydrocarbon feedstock, said process comprising:

forming synthesis gas in an air driven autothermal thermal reactor unit;

heat exchanging the synthesis gas for the production of steam;

treating at least a portion of the synthesis gas in a shift convertor unit, a carbon dioxide absorber, and a des-

|  | ATR Basis Two CO-shift | ATR Basis One CO-shift | ATR Exhaust gas recycle No cooling | ATR Exh. gas recycle Cooling 30° C. | ATR Exh. gas recycle No cooling Reduced process steam | ATR-RE | SR/PR Two CO-shift |
|---|---|---|---|---|---|---|---|
| Natural gas. LVH(MW) | 823.2 | 823.2 | 823.2 | 823.2 | 823.2 | 823.2 | 882.71 |
| Steam:C | 2.0:1 | 2.0:1 | 2.6:1 | 2.6:1 | 2.0:1 | 3.2:1 | 2.8:1 |
| Gas. comp. Turb. fuel: | | | | | | | |
| $CH_4$ | 0.0175 | 0.0173 | 0.0095 | 0.017 | 0.0109 | 0.0023 | 0.0328 |
| CO | 0.0052 | 0.0118 | 0.0024 | 0.0028 | 0.0039 | 0.0034 | 0.0038 |
| $CO_2$ | 0.0006 | 0.0006 | 0.0005 | 0.0005 | 0.0005 | 0.0007 | 0.001 |
| $H_2$ | 0.5611 | 0.5476 | 0.4216 | 0.4015 | 0.4282 | 0.6272 | 0.7697 |
| $N_2$ | 0.4106 | 0.4055 | 0.5592 | 0.5713 | 0.5757 | 0.3621 | 0.1846 |
| Ar | 0.0049 | 0.0048 | 0.0067 | 0.0069 | 0.0069 | 0.0043 | 0.0021 |
| Gas flow kmol/hr. | 17.176 | 17.390 | 23.648 | 23.148 | 22.971 | 17.641 | 15.520 |
| Power.MW gas turbine | 287.42 | 287.87 | 298.82 | 295.25 | 298.39 | 302.03 | 289.77 |
| Power.MW Steam | 139.54 | 137.9 | 143.64 | 135.28 | 154.38 | 113.10 | 149.11 |
| Power.MW Exp.comp. | 4.34 | 4.34 | 4.34 | 4.34 | 4.34 | 4.34 | 4.46 |
| Power.MW Air compr. | 33.82 | 33.82 | 80.66 | 61.12 | 80.64 | 30.61 | 12.55 |
| Total power. MW | 397.48 | 396.29 | 366.14 | 373.75 | 376.47 | 388.86 | 430.79 |
| Efficiency % | 48.3 | 48.1 | 44.5 | 45.4 | 45.7 | 46.9 | 48.8 |
| $CO_2$ recovery % | 88.8 | 85.7 | 91.7 | 87.3 | 90.3 | 95.8 | 84.5 |

From the above results, it can be seen that the process according to the invention can recover as much as 95.8% of the $CO_2$ produced. The results further show that within the inventive concept, the efficiency, power production and $CO_2$ varies depending upon operating conditions and that the process has great flexibility. NOX-formation will generally From the above results, it can be seen that the process according to the invention can recover as much as 95.8% of the $CO_2$ produced. The results further show that within the inventive concept, the efficiency, power production and $CO_2$ varies depending upon operating conditions and that the orber to form concentrated carbon dioxide and a lean hydrogen containing gas from the carbon dioxide absorber;

combusting at least a portion of the of the lean hydrogen containing gas in a combined gas cycle turbine for the production of electric energy;

supplying air from the combined gas cycle turbine to the air driven autothermal thermal reactor unit;

heat exchanging exhaust from the combined gas cycle turbine for the production of additional steam; and supplying the steam and the additional steam to a power generator for the production of substantially $CO_2$-free electrical energy.

2. A process according to claim 1, wherein the air driven autothermal thermal reactor unit is combined with a reformer exchanger to form the synthesis gas.

3. A process according to claim 2, wherein 50–80% of the hydrocarbon feedstock is supplied to the air driven autothermal thermal reactor unit and a remainder of the hydrocarbon feedstock is supplied to the reformer exchanger.

4. A process according to claim 1, further comprising utilizing a pre-reformer upstream of the air driven autothermal thermal reactor unit.

5. A process according to clam 1, wherein the shift convertor unit is a single shift reactor unit.

6. A process according to claim 1, further comprising feeding steam to the combined gas cycle turbine to dilute the portion of the lean hydrogen containing gas.

7. A process according to claim 1, further comprising recycling exhaust gas from the combined gas cycle turbine to the air driven autothermal thermal reactor unit.

8. A process according to claim 1, further comprising combining at least a portion of exhaust gas from the combined gas cycle turbine with air supplied to the combined gas cycle turbine.

9. A process according to claim 1, further comprising producing methanol with a portion of the synthesis gas.

10. A process according to claim 1, further comprising producing ammonia with a portion of the lean hydrogen containing gas, said producing of the ammonia comprising:

separating the portion of the lean hydrogen containing gas to adjust a nitrogen:hydrogen ratio of an outputted stream to ammonia conditions in a membrane unit; and returning separated nitrogen to the portion of the lean hydrogen containing gas stream combusted in the combined gas cycle turbine, wherein the nitrogen:hydrogen ratio of the stream is 1:3 and the stream is treated in a methanator prior to ammonia synthesis.

11. A process according to claim 1, further comprising feeding a portion of the lean hydrogen containing gas as a fuel to a fuel cell for the production of electric energy.

* * * * *